(12) United States Patent  
Kojima et al.

(10) Patent No.: US 6,722,638 B2  
(45) Date of Patent: Apr. 20, 2004

(54) CONTROL SYSTEM FOR CHOKE VALVE OF CARBURETOR

(75) Inventors: Hiroaki Kojima, Saitama (JP); Hiroshi Moriyama, Saitama (JP); Ryuhei Tamamoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/329,298

(22) Filed: Dec. 24, 2002

(65) Prior Publication Data

US 2003/0164558 A1 Sep. 4, 2003

(30) Foreign Application Priority Data

| Dec. 27, 2001 | (JP) | ................................. 2001-397757 |
| Dec. 27, 2001 | (JP) | ................................. 2001-397758 |
| Dec. 27, 2001 | (JP) | ................................. 2001-397759 |
| Dec. 27, 2001 | (JP) | ................................. 2001-397760 |
| Jul. 16, 2002 | (JP) | ................................. 2002-207147 |

(51) Int. Cl.$^7$ ................................................ F02M 1/10
(52) U.S. Cl. .................... 261/39.2; 261/39.4; 261/64.6
(58) Field of Search .................... 261/39.1, 39.2, 261/39.4, 64.1, 64.6

(56) References Cited

U.S. PATENT DOCUMENTS

| 2,470,742 | A | * | 5/1949 | Haase et al. ............... 236/92 R |
| 3,740,040 | A | * | 6/1973 | Brown et al. .............. 261/23.2 |
| 3,804,384 | A | * | 4/1974 | Zahr et al. ................. 261/44.4 |
| 3,821,943 | A | * | 7/1974 | Toda et al. ................. 123/327 |
| 3,907,944 | A | * | 9/1975 | Nakada ....................... 261/39.1 |
| 4,071,585 | A | * | 1/1978 | Konishi et al. ............ 261/36.2 |
| 4,110,417 | A | * | 8/1978 | Konishi et al. ............ 261/39.2 |
| 4,228,111 | A | * | 10/1980 | Nakamura ................... 261/44.4 |
| 4,302,404 | A | * | 11/1981 | Nakamura et al. ......... 261/44.4 |
| 4,517,134 | A | * | 5/1985 | Nakamura et al. ......... 261/39.2 |
| 4,545,350 | A | * | 10/1985 | Nakamura et al. .......... 123/439 |
| 6,164,673 | A | * | 12/2000 | Matsuura ............. 280/124.101 |
| 6,305,341 | B1 | * | 10/2001 | Saiga ....................... 123/195 A |

FOREIGN PATENT DOCUMENTS

| JP | 63-24354 | | 2/1988 |
| JP | 2-140450 | * | 5/1990 ................ 261/39.1 |

\* cited by examiner

Primary Examiner—Richard L. Chiesa  
(74) Attorney, Agent, or Firm—Carrier, Blackman & Associates, P.C.; Joseph P. Carrier; William D. Blackman

(57) ABSTRACT

A choke valve control system includes a choke-operating lever for opening and closing a choke valve of a carburetor, a choke spring for biasing the valve in an opening direction, and a damper for controlling the opening motion of the valve to a lower speed, when the choke valve is opened from its fully closed position by a biasing force of the choke spring. The choke-operating lever, the choke spring and the damper are connected to the choke valve of the carburetor. In this choke valve control system, the damper includes a damper housing, a rotor, and a damper oil which is accommodated in a sealed manner in the damper housing and applies a viscosity resistance to the rotation of the rotor, which resistance increases as the viscosity increases with decreasing temperature. Thus, the time required for opening the choke valve can be controlled in accordance with the level of the environmental temperature of an engine, thereby providing the stabilization of the warming operation of the engine and a reduction in fuel consumption.

16 Claims, 18 Drawing Sheets

CONTROL SYSTEM FOR CHOKE VALVE OF CARBURETOR

BACKGROUND OF THE INVENTION

1. Field of the Invention

The present invention relates to an improvement in a control system for a choke valve of a carburetor, including a choke-operating lever for opening and closing the choke valve of the carburetor, a choke spring for biasing the valve in an opening direction, and a damper for controlling the opening motion to a lower speed, when the choke valve is opened from its fully closed position by a biasing force of the choke spring. The choke-operating lever, the choke spring and the damper are connected to the choke valve of the carburetor, so that after starting of an engine with the choke valve closed, the choke valve is opened automatically in response to the progress of the warming operation of the engine, thereby providing the stabilization of the warming operation and a reduction in fuel consumption.

2. Description of the Related Art

In a conventional control system for the choke valve of the carburetor, the damper an air type in which the opening motion of the choke valve is slowed down by a damping force generated upon passing of air through an orifice (see Japanese Utility Model Application Laid-open No. 63-24354.

For providing the stabilization of the warming operation and a reduction in fuel consumption, it is important that the time required from the full closing to the full opening of the choke valve after starting of the engine is controlled in accordance with the level of the environmental temperature of the engine. Namely, it is necessary to provide the choke valve control system with the characteristic that the lower the environmental temperature, the longer the required time for the valve to go from fully closed to fully open.

In the control system for the choke valve of the carburetor using the air damper, as described above, however, the damping force generated in the air damper is constant irrespective of the level of the environmental temperature of the engine and hence, the time required for fully opening the choke valve controlled by the control system is also constant. Thus, it is impossible to satisfy the above-described required characteristic.

SUMMARY OF THE INVENTION

Accordingly, it is an object of the present invention to provide a control system for a choke valve of a carburetor, which is designed so that the above-described required characteristic can be satisfied.

To achieve the above object, according to the present invention, there is provided a control system for a choke valve of a carburetor, comprising a choke-operating lever for opening and closing the choke valve of the carburetor, a choke spring for biasing the valve in an opening direction, and a damper for controlling opening motion of the choke valve to a lower speed, when the choke valve is opened from its fully closed position by a biasing force of the choke spring, the choke-operating lever, the choke spring and the damper being connected to the choke valve of the carburetor, wherein the damper is an oil type using a damper oil whose viscosity is increased in accordance with a temperature drop or decrease.

With the first feature, a damping force generated by the oil damper is increased in accordance with the decrease of the environmental temperature of the engine. Therefore, the time required from the full closing to the full opening of the choke valve can be controlled, so that the time is longer when the environmental temperature is lower, and the time is shorter when the environmental temperature is higher. Thus, it is possible to satisfy the easy/ready startability of the engine, the stabilization of the warming operation of the engine and a low fuel consumption.

According to a second feature of the present invention, in addition to the first feature, the damper comprises a damper housing, a rotor rotatably housed in the damper housing, and the damper oil accommodated in a sealed manner in the damper housing and applying a viscosity resistance to the rotation of the rotor, the damper housing being supported on a stationary structure, and the rotor being connected to the choke valve so that the rotor is rotated in operable association with the opening and closing of the choke valve.

With the second feature, the damper can be constructed compactly by a small number of parts, which can contribute to a reduction in cost of and the compactness of the choke control system.

The stationary structure corresponds to a bracket 14 in each of embodiments of the present invention which will be described hereinafter.

According to a third feature of the present invention, in addition to the first or second feature, a driven member is connected to a valve stem of the choke valve, and a resilient driving member is connected to the choke-operating lever and adapted to be flexed to urge one side of the driven member in operable association with the operation of the choke-operating lever in a direction of closing of the choke valve, thereby closing the choke valve.

With the third feature, fabrication errors of various portions of the choke valve control system are absorbed by the flexing of the resilient driving member, and the choke valve can be brought reliably and at any time into the fully closed state.

The driven member and the resilient driving member correspond to a driven pin and a resilient driving plate 47 in each of the embodiments of the present invention which will be described hereinafter.

According to a fourth feature of the present invention, in addition to the second feature, a cam adapted to be rotated in operable association with the opening and closing operation of the choke-operating lever, and a cam follower adapted to be moved following a cam surface of the cam to open and close the choke valve are interposed between the choke-operating lever and the choke valve.

With the fourth feature, after starting of the engine with the choke valve fully closed, the time required for fully opening the choke valve is controlled by the damper, E and the opening degree of the choke valve during such controlling is controlled by the cam surface. Therefore, a desired opening degree characteristic assuring that the fully closed state is maintained, can be provided to the choke valve during the passage of time by the selection of the shape of the cam surface, thereby providing the stabilization of the warming operation and an enhancement in low fuel consumption.

According to a fifth feature of the present invention, in addition to the first feature, the damper comprises a damper housing and the damper oil accommodated in a sealed manner in the damper housing and applying a viscosity resistance to the rotation of a rotor, the damper housing being supported on a stationary structure, and wherein the rotor and the cam are connected to each other through an accelerating mechanism for accelerating the rotation of the cam to transmit it to the rotor.

With the fifth feature, a damping force generated by the damper is increased in accordance with a drop or decrease of the environmental temperature of the engine. Therefore, the time required for fully opening the choke valve can be controlled automatically, so that the time is longer when the environmental temperature is lower, and the time is shorter when the environmental temperature is higher. Thus, it is possible to satisfy the easy/ready startability of the engine, the stability of the warming operation of the engine and a low fuel consumption.

Moreover, the damper can generate sufficient damping force, although the damper is compact, by transmitting the rotation of the cam to the rotor of the damper through the accelerating mechanism and thus, it is possible to provide a satisfactory time required for fully opening the choke valve.

According to a sixth feature of the present invention, in addition to the first feature, the damper comprises a damper housing, a rotor rotatably housed in the damper housing and the damper oil which is accommodated in a sealed manner in the damper housing and whose viscosity is increased in accordance with a temperature drop to apply a viscosity resistance to the relative rotation of the rotor and the damper housing, one of the damper housing and the rotor being secured to a stationary structure, the choke-operating lever being integrally connected to the other of the damper housing and the rotor, and wherein a return spring for biasing the choke-operating lever in a direction to open the choke valve is connected to the choke-operating lever.

With the sixth feature, a damping force generated by the oil-type damper is increased in accordance with a decrease of the environmental temperature of the engine. Therefore, the time required from the full closing to the full opening of the choke valve can be controlled automatically, so that the time is longer when the environmental temperature is lower, and the time is shorter when the environmental temperature is higher. Thus, it is possible to satisfy the easy/ready startability of the engine, the stability of the warming operation of the engine and a low fuel consumption.

In addition, the oil-type damper comprising the damper housing, the rotor and the damper oil is constructed by a small number of parts to be compact. Moreover, it is possible to reduce the number of parts of the choke valve control system by the integral connection of any one of the damper housing and the rotor with the choke-operating lever, to thereby simplify the structure to provide the compactness and reduce the cost of the choke valve control system.

According to a seventh feature of the present invention, in addition to the sixth feature, the choke-operating lever is provided with a cam which is engaged with a cam follower supported on the stationary structure and operably connected to the choke valve, the cam being formed so that the motion of the choke-operating lever for opening the choke valve is transmitted through the cam follower to the choke valve in a retarded manner.

With the seventh feature, even if the turning speed of the choke-operating lever in the direction to open the choke valve, which is determined by the damping force of the oil damper and the return spring, is constant, the opening of the choke valve can be retarded as desired by the shape of the cam to provide the easy/ready startability of the engine and the stabilization of the warming operation of the engine.

According to an eighth feature of the present invention, in addition to the first feature, a cam adapted to be rotated in operable association with the opening and closing operation of the choke-operating lever and a cam follower adapted to be moved following a cam surface of the cam to open and close the choke valve are interposed between the choke-operating lever and the choke valve.

According to a ninth feature of the present invention, in addition to the eighth feature, the damper comprises a damper housing, and the damper oil which is accommodated in a sealed manner in the damper housing and applies a viscosity resistance to the rotation of a rotor, the damper housing being supported on a stationary structure, and wherein the rotor and the cam are connected to each other through an accelerating mechanism for accelerating the rotation of the cam to transmit it to the rotor.

According to a tenth feature of the present invention, there is provided a control system for a choke valve of a carburetor in a power working machine including an engine which has a cooling fan mounted at an upper end of a crankshaft disposed vertically, a working device connected to a lower end of the crankshaft, and an engine cover which has a cooling-air intake port opposed to the cooling fan and covers an upper surface of the engine so that cooling air drawn through the cooling-air intake port by the cooling fan is guided to the engine, the control system comprising: a choke-operating lever for opening and closing a choke valve of a carburetor mounted on one side of the engine; a choke spring for biasing the choke valve in an opening direction; and a damper for controlling the motion of opening of the choke valve to a lower speed, when the choke valve is opened from its fully closed position by a biasing force of the choke spring, wherein the damper an oil type using an damper oil whose viscosity is increased in accordance with a temperature decrease.

According to an eleventh feature of the present invention, in addition to the tenth feature, the damper is disposed in a path for the cooling air extending from the cooling-air intake port to the engine.

With the eleventh feature, the cooling air drawn through the cooling-air intake port in the engine cover by the cooling fan during operation of the engine is passed through the damper and around the damper in a course of being fed under pressure to the engine, whereby it blows away dusts deposited on the damper and parts of the choke valve control system connected to the damper to clean them. Therefore, it is possible to prevent the dusts blown up by the working device from being accumulated on the damper and the like, thereby also preventing any associated malfunction of the damper and the like, and cooling the damper to enhance the durability thereof.

According to a twelfth feature of the present invention, in addition to the tenth feature, a tip end of the choke-operating lever is disposed to protrude outside of the engine cover.

With the twelfth feature, the choke-operating lever can be opened and closed easily without being obstructed by the engine cover. Moreover, the choke-operating lever can be visually seen and hence, it is easy to confirm the position of the choke-operating lever and it is possible to easily carry out the appropriate control of the choke valve.

According to a thirteenth feature of the present invention, in addition to the tenth feature, the power working machine further includes a braking mechanism capable of braking the rotation of an output shaft of the engine, and a brake release mounted on a steering handle bar for releasing the operational state of the braking mechanism; the choke-operating lever, the choke spring and the damper are connected to the choke valve; the choke-operating lever is adapted to be turned between an opening position and a closing position to open and close the choke valve; and a locking mechanism is interposed between the choke-operating lever and the braking mechanism and adapted to lock the choke-operating lever at the closing position when the braking mechanism is in operation, and to release the locked state of the choke-operating lever when the operation of the braking mechanism is released.

With the thirteenth feature, when the operation of the braking mechanism is released, the locked state of the choke-operating lever is released automatically in operable association with the releasing of the operation of the braking mechanism, and the closing of the choke valve is controlled automatically to a lower speed. Therefore, a special operation for returning the choke-operating lever is not required and thus, it is possible to alleviate a burden on an operator, and also to prevent the malfunction of the engine and the degradation of the fuel consumption due to the operator forgetting to open the choke valve.

According to a fourteenth feature of the present invention, in addition to the thirteenth feature, the damper is comprised of a damper housing, a rotor rotatably housed in the damper housing and the damper oil accommodated in a sealed manner in the damper housing and applying a viscosity resistance to the rotation of a rotor, the damper housing being supported on a stationary structure, and wherein the rotor and a cam operatively associated with the choke-operating lever and the choke valve are connected to each other through an accelerating mechanism for accelerating the rotation of the cam to transmit it to the rotor.

With the fourteenth feature, a damping force generated by the damper is increased in accordance with the decrease of the environmental temperature of the engine. Therefore, the time required for the full opening of the choke valve can be controlled, so that the time is longer when the environmental temperature is lower, and the time is shorter when the environmental temperature is higher. Thus, it is possible to satisfy the easy/ready startability of the engine, the stabilization of the warming operation of the engine and a low fuel consumption.

Moreover, the damper can generate a sufficient damping force although the damper is compact, thereby providing a satisfactory time required for the full opening of the choke valve, by transmitting the rotation of the cam through the accelerating mechanism to the rotor of the damper.

The above and other objects, features and advantages of the invention will become apparent from the following detailed description of the preferred embodiments taken in conjunction with the accompanying drawings.

DESCRIPTION OF THE PREFERRED EMBODIMENTS

The present invention will now be described by way of preferred embodiments with reference to the accompanying drawings.

Figure 1:
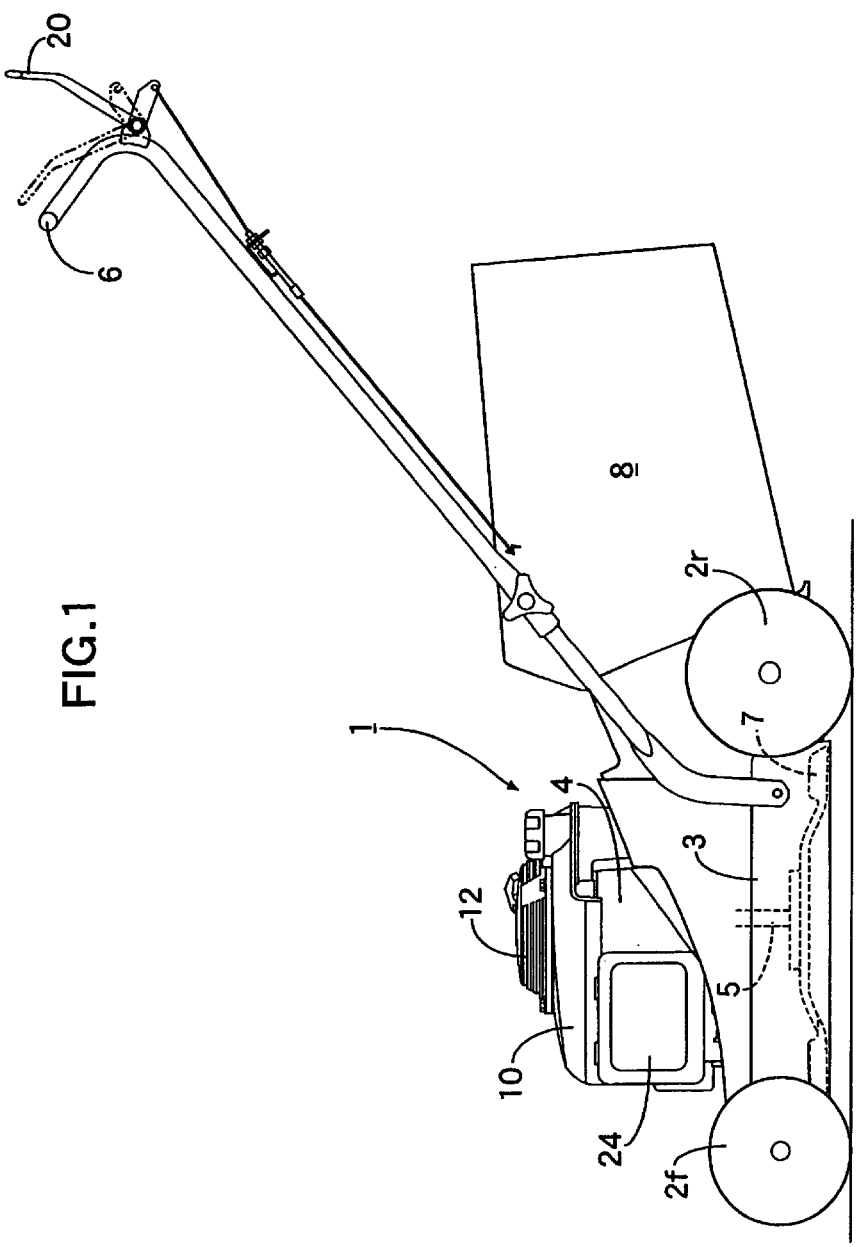
FIG. 1 is a side view of a power lawn mower which includes an engine including a choke valve control system according to a first embodiment of the present invention.

Referring first to FIG. 1, a walking-type power lawn mower 1 as a power working machine includes a housing 3 supported by a front wheel 2f and a rear wheel 2r. A vertical engine 4 having a crankshaft 5 disposed vertically therein is mounted on an upper surface of the housing 3. A rotary mowing blade 7 mounted at a lower end of the crankshaft 5 is disposed within the housing 3. A lawn bag 8 is mounted to a steering handlebar 6 coupled to a rear end of the housing 3, so that lawn pieces cut by the mowing blade are accommodated in the lawn bag 8.

Figure 2:
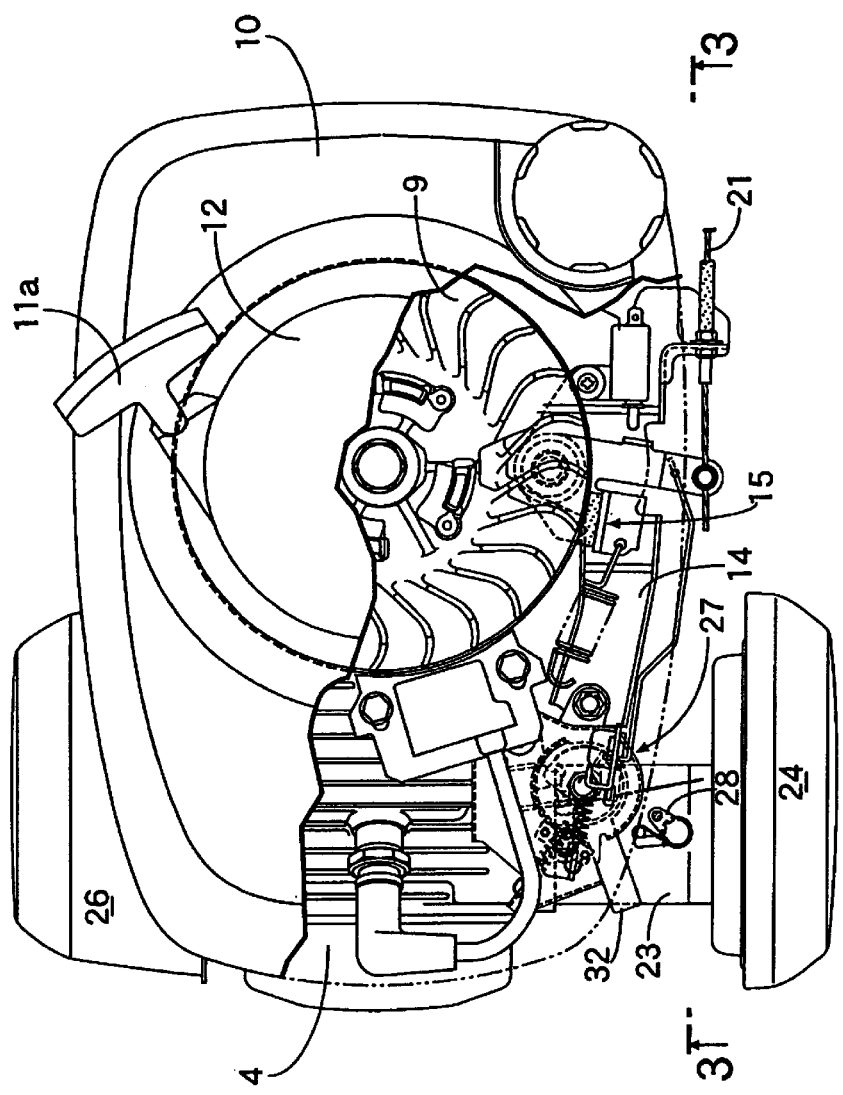
FIG. 2 is a partially cutaway plan view of the engine.
Figure 3:
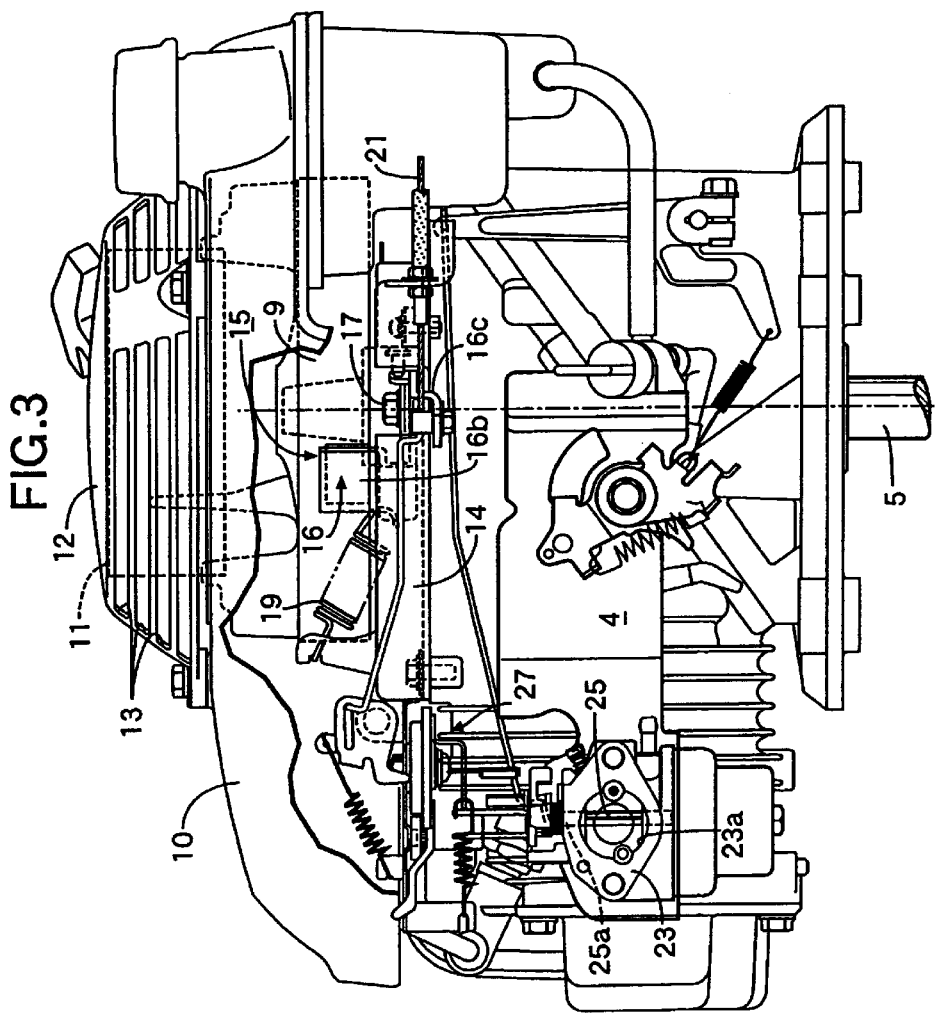
FIG. 3 is a sectional view taken along a line 3—3 in FIG. 2.

Referring to FIGS. 2 to 5, a flywheel 9 also serving as a cooling fan is secured to an upper end of the crankshaft 5 of the engine 4. An engine cover 10 for covering an upper surface of the engine 4 along with the flywheel 9 is secured to the engine 4. Mounted to the engine cover 10 are a recoil-type starter 11 capable of driving the crankshaft 5 through the flywheel 9, and a starter cover 12 which covers the starter 11. The starter cover 12 has a plurality of cooling-air intake ports 13 provided therein, so that cooling air is drawn through the cooling-air intake ports 13 into the engine cover 10. The cooling air is guided to various portions of the engine 4 by the engine cover 10. Reference numeral 11a in FIG. 2 is a rope-pulling grip of the starter 11.

A brake shoe 16 cooperating with a cylindrical outer peripheral surface of the flywheel 9 is mounted through a pivot 17 to a bracket 14 secured to the engine 4 below the flywheel 9. The pivot 17 is disposed at a location displaced inwards from the outer peripheral surface of the flywheel 9.

The brake shoe 16 includes an arm 16a extending outwards of the outer peripheral surface of the flywheel 9 through between the bracket 14 and the flywheel 9, and a pressure-contact portion 16b bent from a tip end of the arm 16a and opposed to the outer peripheral surface of the flywheel 9. A lining 18 is adhered to the pressure-contact portion 16b.

Thus, the brake shoe 16 can be swung about the pivot 17 between a braking position A (see FIG. 5) in which the lining 18 on the pressure-contact portion 16b is in pressure contact with the outer peripheral surface of the flywheel 9, and a brake-releasing position B (see FIGS. 8 and 9) in which the lining 18 is spaced apart from the outer peripheral surface of the flywheel 9. A brake spring 19 for biasing the brake shoe 16 toward the braking position A is connected to a front end of the pressure-contact portion 16b of the brake shoe 16. A braking mechanism 15 for stopping the rotation of the crankshaft 5 is constituted by the brake shoe 16, the flywheel 9 and the brake spring 19.

An operating arm 16c is integrally formed on the brake shoe 16, and an operating wire 21 to be pulled by a brake-releasing lever 20 (see FIG. 1) supported on the steering handlebar 6 is connected to a tip end of the operating arm 16c. Thus, when the operating wire 21 is pulled, the brake shoe 16 can be turned to the brake-releasing position B through the operating arm 16c.

Figure 5:
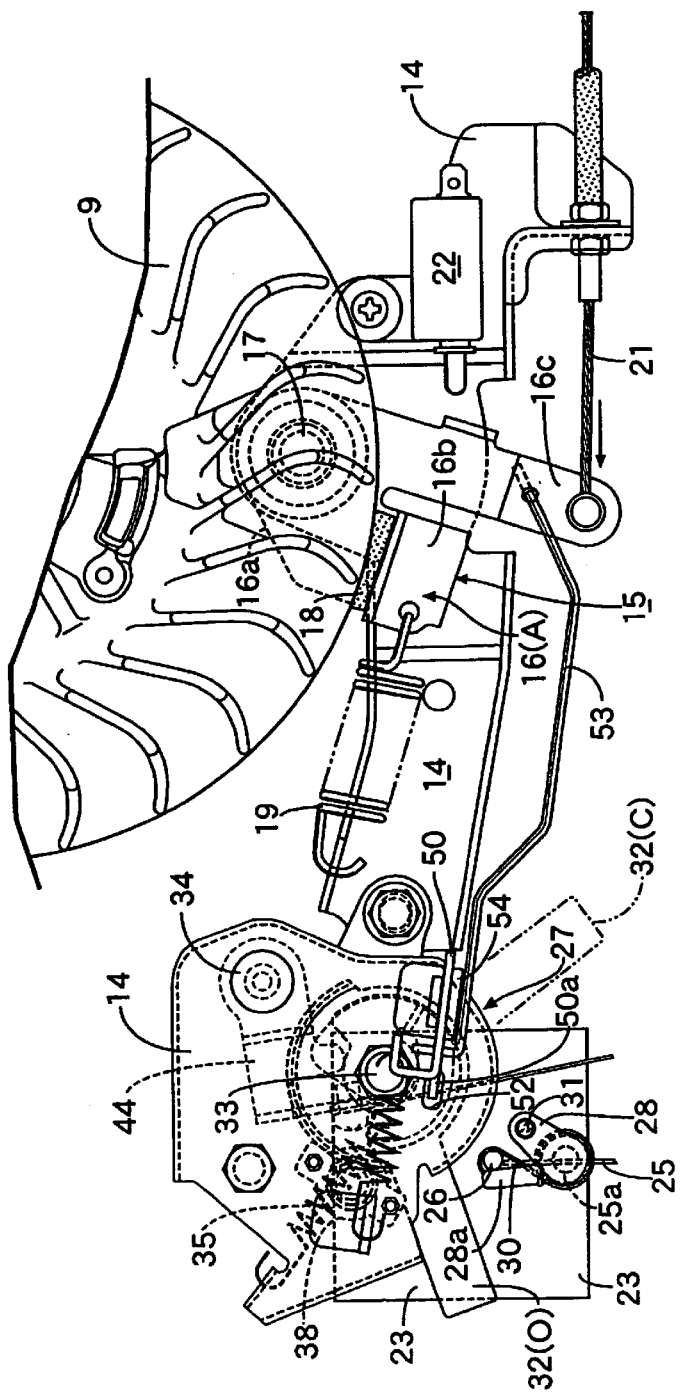
FIG. 5 is a view taken along a line 5—5 in FIG. 4 (showing the operational state of a braking mechanism and the fully opened state of a choke valve)
Figure 8:
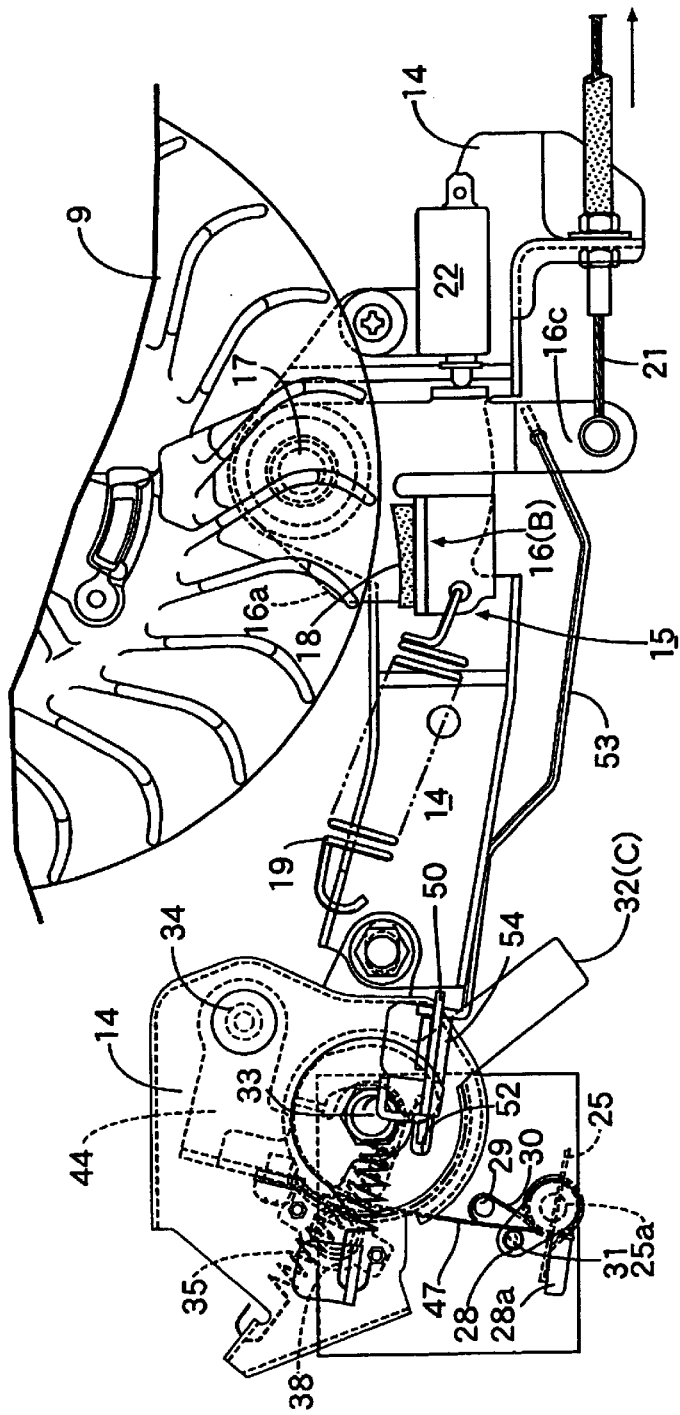
FIG. 8 is a view similar to FIG. 5, but showing the operation-released state of the braking mechanism and the fully closed state of the choke valve.
Figure 9:
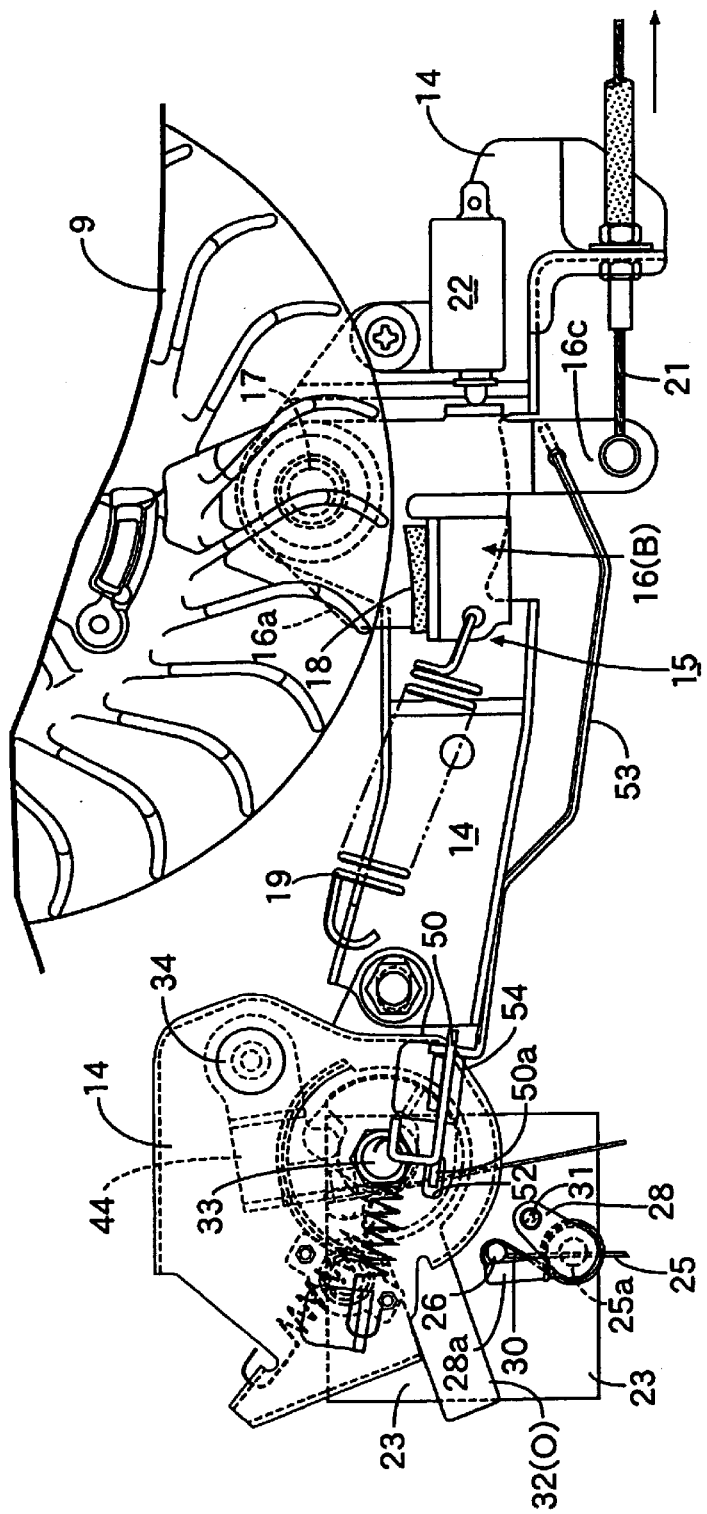
FIG. 9 is a view similar to FIG. 5, but showing the operation-released state of the braking mechanism and the fully opened state of the choke valve.
Figure 10:
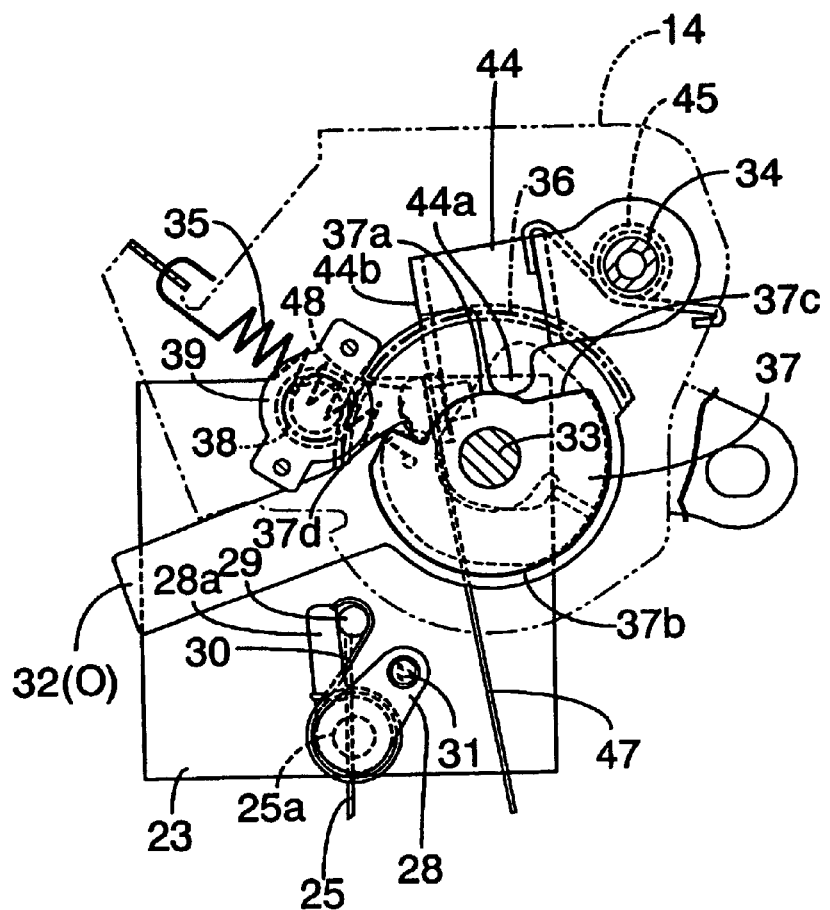
FIG. 10 is a view similar to FIG. 6, but showing the fully opened state of the choke valve.

As shown in FIGS. 5 and 8, an engine-killing switch 22 is placed on an upper surface of the bracket 14. When the brake shoe 16 is brought into the braking position A, the engine-killing switch 22 brings an engine ignition circuit (not shown) into an inoperative state in operable association with the brake shoe 16 reaching the braking position A, thereby terminating the operation of the engine 4.

Figure 4:
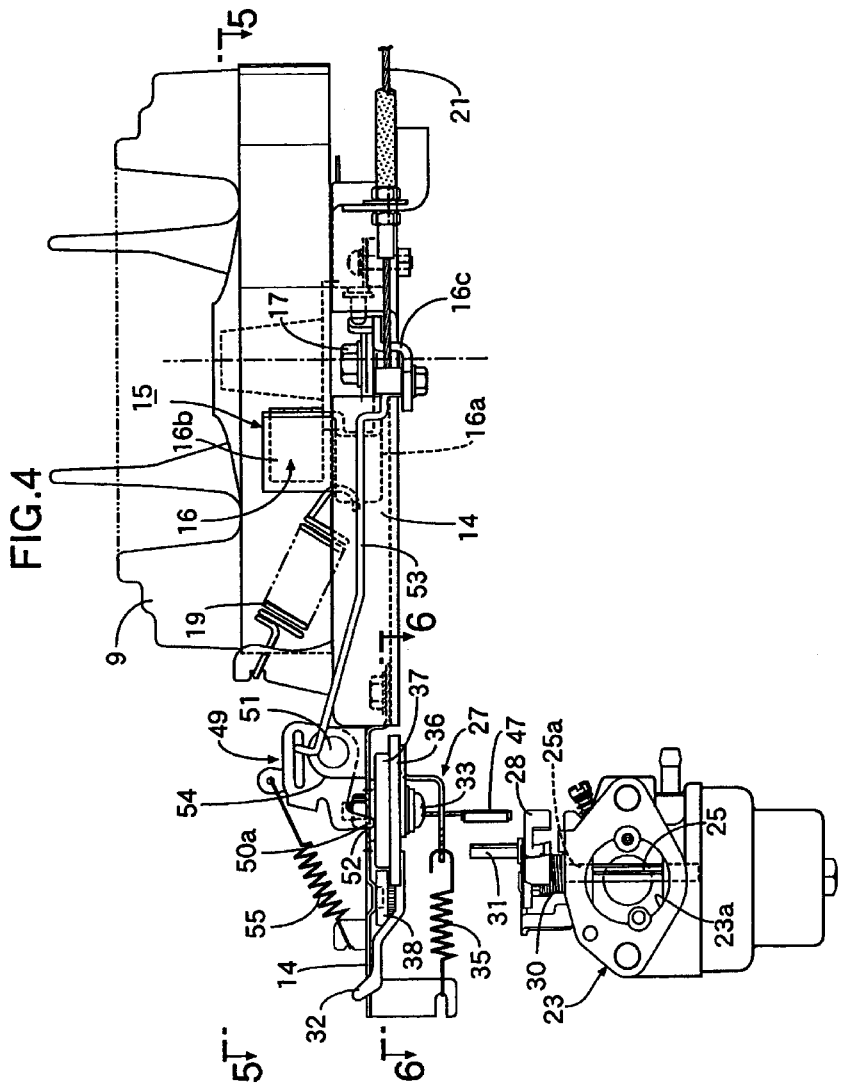
FIG. 4 is a side view of essential portions of FIG. 3.

As shown in FIGS. 2 and 4, a carburetor 23 is mounted to one of left and right sides of the engine 4, and an exhaust muffler 26 is mounted to the other side. An air cleaner 24 is connected to an inlet of an intake passage 23a in the carburetor 23.

A butterfly-type choke valve 25 for opening and closing an upstream portion of the intake passage 23a is provided in the carburetor 23 with its valve stem 25a turned vertically, as is the crankshaft 5 of the engine 4. A choke valve control system 27 for controlling the opening and closing of the choke valve 25 will be described below.

Referring to FIGS. 4 to 10, a choke lever 28 is secured to an upper end of the valve stem 25a of the choke valve 25, which protrudes above the carburetor 23, so that the fully-opened position of the choke valve 25 is defined by the abutment of a stopper arm 28a integral with the choke lever 28 against a fully-opening stopper pin 29 projectingly provided on an upper surface of the carburetor 23. A choke spring 30 for biasing the choke valve 25 toward the fully-opened position is connected to the choke lever 28. A driven pin 31 is integrally formed on an upper surface of the choke lever 28 to protrude upwards.

The bracket 14 extends to above the carburetor 23, and a choke-operating lever 32 is mounted to a lower surface of such an extension of the bracket 14, so that it can be turned by a first pivot 33 between an opening position O and a closing position C. A return spring 35 for biasing the choke-operating lever 32 toward the opening position O is connected to the choke-operating lever 32.

The choke-operating lever 32 is integrally formed with a sector gear 36 concentric with the first pivot 33, and a cam 37 disposed on an upper surface of the sector gear 36. The sector gear 36 is meshed with a pinion gear 39 of a rotary oil damper 38 mounted to a lower surface of the bracket 14.

Figure 11:
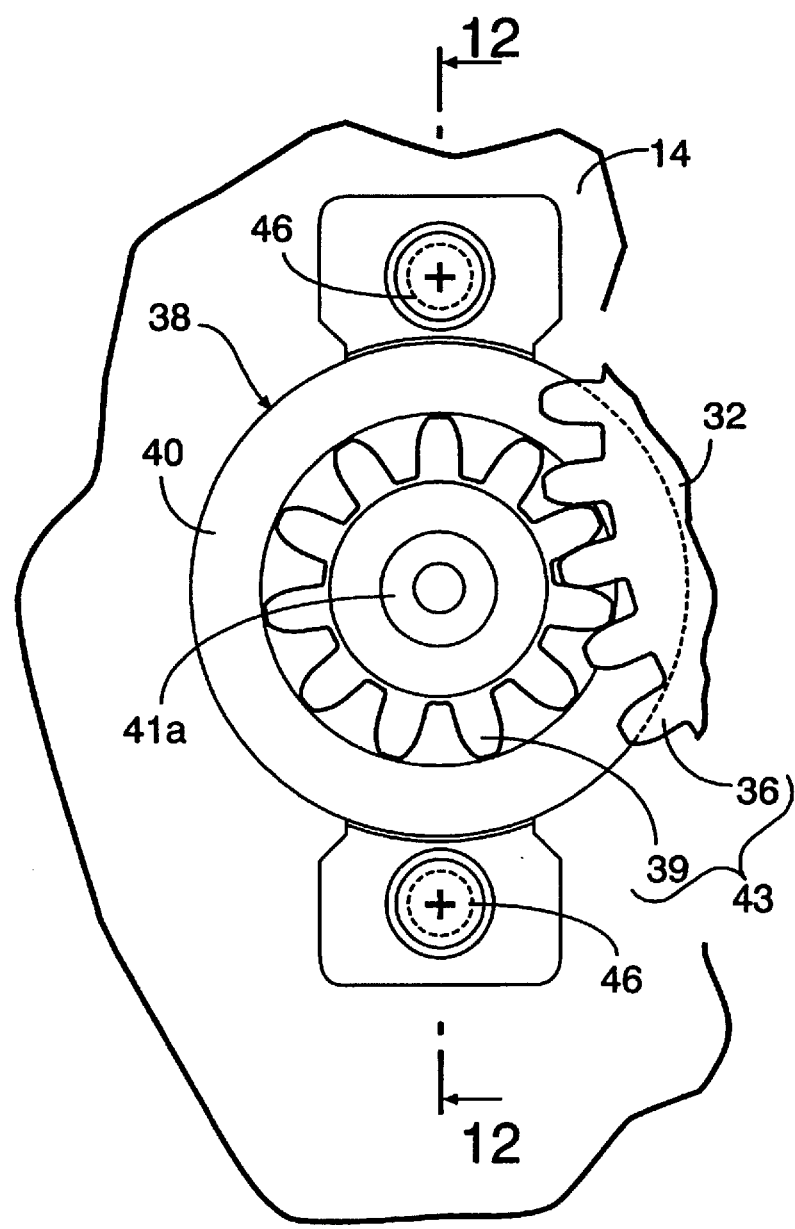
FIG. 11 is an enlarged plan view of a damper section in FIG. 6 (a sectional view taken a long a line 11—11 in FIG. 12)
Figure 12:
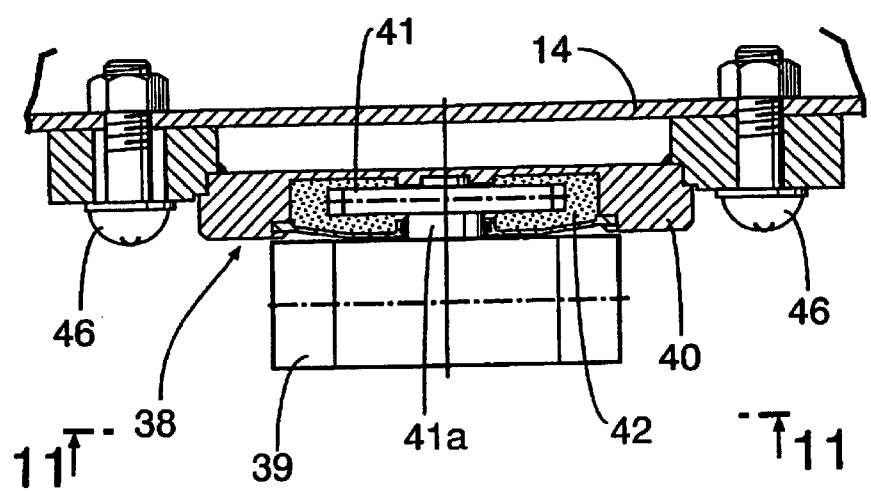
FIG. 12 is a sectional view taken along a line 12—12 in FIG. 11.

The oil damper 38 is comprised of, as clearly shown in FIGS. 11 and 12, a damper housing 40 secured to the bracket 14 by a machine screw 46, a rotor 41 rotatably housed in the housing 40, and a damper oil 42 accommodated in a sealed manner in the damper housing 40 to apply a damping force attributable to a viscosity resistance to the rotor 41. The damper oil 42 has a viscosity characteristic whereby the viscosity increases in accordance with a drop or decrease in temperature. The pinion gear 39 is secured to an outer end of a rotary shaft 41a of the rotor 41, the rotary shaft 41a being oil-tightly supported at a bearing portion of the damper housing 40. The sector gear 36 has a diameter larger than that of the pinion gear 39, and an accelerating mechanism 43 for accelerating the rotation of the cam 37 to transmit it to the rotor 41 is constituted by these gears 36 and 39.

Figure 6:
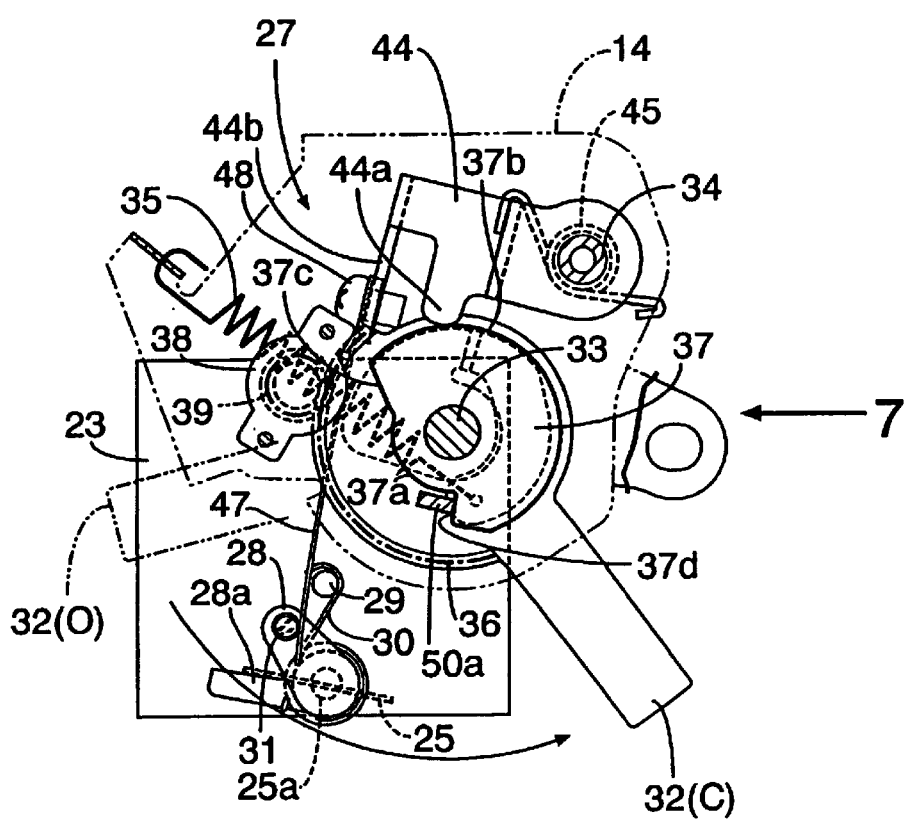
FIG. 6 is a sectional view taken along a line 6—6 in FIG. 4 (showing the fully closed state of the choke valve)
Figure 7:
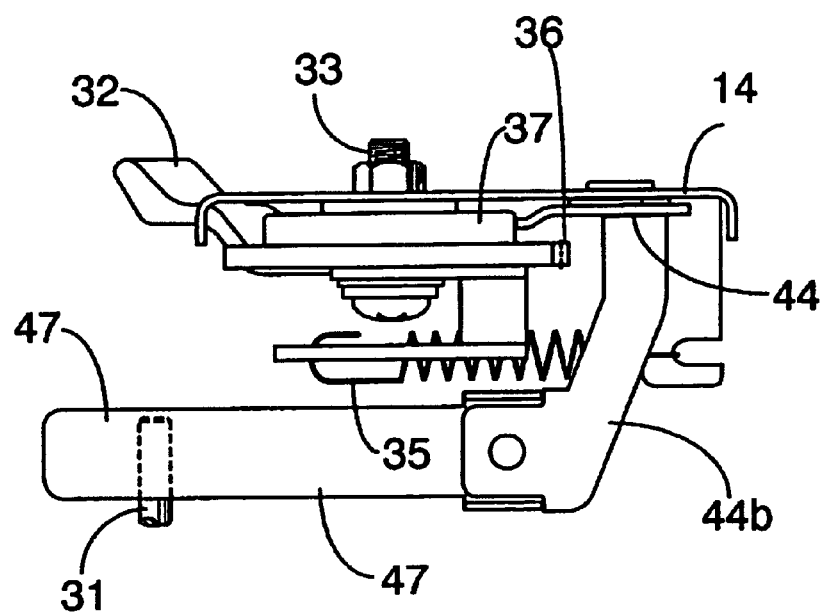
FIG. 7 is a view taken in a direction of an arrow 7 in FIG. 6.

Referring to FIG. 6, the cam 37 has, around its outer periphery, a cam surface comprising a minor arc-shaped valley 37a having a relatively small radium about the first pivot 33, a major arc-shaped crest 37b having a relatively large radius about the first pivot 33, a slant 37c connecting one end of the valley 37a and one end of the crest 37b to each other, and a precipice face 37d connecting the other ends of the valley 37a and the crest 37b to each other. A cam follower 44 is rotatably mounted to the bracket 14 by a second pivot 34, and operably connects the cam 37 and the choke lever 28 to each other. The cam follower 44 has a projection 44a adapted to slidably abut against the cam surface of the cam 37, and an urging spring 45 is connected to the projection 44a to bring the projection 44a into abutment against the cam surface of the cam 37. When the choke-operating lever 32 is in the opening position O, the projection 44a is in abutment against the valley 37a of the cam 37, and when the choke-operating lever 32 is turned through a predetermined angle from the opening position O toward the closing position C, the position of abutment of the projection 44a is shifted via the slant 37c to the crest 37b.

A resilient driving plate 47 comprising a leaf spring for driving the driven pin 31 of the choke lever 28 is connected to the mounting piece 44b at a tip end of the cam follower 44. Thus, when the choke-operating lever 32 is turned to the closing position C, the crest 37b of the cam 31 urges the projection 44a to turn the cam follower 44, and in response to this, the resilient driving plate 47 urges one side of the driven pin 31 to fully close the choke valve 25 through the choke lever 28. The choke-operating lever 32 is further slightly turned until it reaches the closing position C even after the fully closing of the choke valve 25, thereby causing the flexing of the resilient driving plate 47 to continuously push the driven pin 31. This ensures that fabrication errors of various portions of the choke valve control system 27 can be absorbed by the flexing of the resilient driving plate 47, whereby the full closing of the choke valve 25 can be ensured at any time.

As shown in FIGS. 4 to 6, a small bracket 54 is formed on the upper surface of the bracket 14 to rise upwards, and a locking lever 50 for restricting the choke-operating lever 32 at the closing position C and releasing the choke-operating lever 32 is mounted to the small bracket 54, so that it can be turned by a pivot 51. The locking lever 50 includes a locking claw 50a adapted to be moved through a guide bore 52 in the bracket 14 toward the cam 37 and to be retracted upwards out of the guide bore 52, and a locking spring 55 is connected to the locking lever 50 to bias the locking claw 50a toward the upper surface of the cam 37. When the choke-operating lever 32 reaches the closing position C, the locking claw 50a can be brought into engagement with the precipice face 37d to lock the choke-operating lever 32 at the closing position C. A locking mechanism 49 capable of locking the choke-operating lever 32 at the closing position C is constituted by the locking lever 50, the locking spring 55 and the precipice face 37d.

The locking lever 50 is connected through a link 53 to the brake shoe 16 and adapted to be turned to disengage the locking claw 50a from the cam 37 in operable association with the turning of the brake shoe 16 to the brake-releasing position B.

The choke valve control system 27 is disposed so that its upper surface is covered along with the engine 4 by the engine cover 10 and it faces a cooling-air path extending from the cooling-air intake ports 13 to the engine 4. However, the choke-operating lever 32 is disposed so that its tip end protrudes to the outside of the engine cover 4, as shown in FIG. 2, whereby an operator can easily turn the choke-operating lever 32.

The operation of the embodiment will be described below.

In a state in which the brake shoe 16 is in the braking position A to apply a braking force to the flywheel 9, the locking lever 50 is turned downwards by a biasing force of the locking spring 55 to urge the locking claw 50a against the upper surface of the cam 37 through the guide bore 52 in the bracket 14.

When the engine 4 is started in a cold season, the choke-operating lever 32 of the carburetor 23 is first turned to the closing position C to turn the cam follower 44 by the crest 37b of the cam 37, while expanding the return spring 35, whereby the driven pin 31 is urged from sideways by the resilient driving plate 47 to bring the choke valve 25 to the fully closed state. In this state, the locking claw 50a of the locking lever 50 biased downwards is brought into engagement with the precipice face 37d. When this is achieved, the choke-operating lever 32 is locked at the closing position C, and the return spring 35 remains expanded, even if the operating force is released from the choke-operating lever 32.

Then, the brake shoe 16 is turned to the brake-releasing position B (see FIG. 8) by grasping the brake-releasing lever 20 along with the steering handlebar 6 to pull the operating wire 21, thereby releasing the braking force applied to the flywheel 9. Therefore, the crankshaft 5 is free to rotate. At this time, the engine-killing switch 22 is brought into the inoperative state by the brake shoe 16 (the ignition circuit is brought into an operable state), and at the same time the brake shoe 16 pulls the locking lever 50 through the link 53 to disengage the locking claw 50a from the precipice face 37d of the cam 37, thereby releasing the cam 37.

As a result, the choke-operating lever 32 is started to return toward the opening position O by the biasing force of the return spring 35. However, the sector gear 36 integral with the choke-operating lever 32 rotates the rotor 41 of the oil damper 38 through the pinion gear 39, and hence the rotor 41 receives the damping force attributable to the viscosity resistance from the damper oil 42. This damping force causes the turning movement of the choke-operating lever 32 toward the opening position O to be controlled to a lower speed. Moreover, despite the returning of the choke-operating lever 32, the choke valve 25 can be maintained in the fully closed state as long as the projection 44a of the cam follower 44 is urged by the major arc-shaped crest 37b of the cam 37.

Moreover, the rotation of the cam 37 is accelerated by the sector gear 36 and the pinion gear 39 and transmitted to the rotor 41 and hence, the damper 38 generates a sufficient damping force although the damper is compact, whereby the turning speed of the choke-operating lever 32 can be controlled appropriately.

If the recoil starter 11 is operated to crank the engine 4 immediately after the turning of the brake shoe 16 to the brake-releasing position B, a rich fuel-air mixture suitable for the cold starting of the engine is produced by the full closing of the choke valve 25 in the carburetor 23, and the engine 4 with the fuel-air mixture drawn thereinto can be started immediately.

Even after the starting of the engine 4, the fully closed state of the choke valve 25 is maintained for a relatively long period of time by the actions of the damper 38 and the crest 37b of the cam 37 and hence, a stable warming operational state can be ensured.

When the position of abutment of the projection 50a of the locking lever 50 against the cam 37 is shifted from the crest 37b to the valley 37a by the turning movement of the cam 37 caused by the biasing force of the return spring 35, the resilient driving plate 47 is moved away from the driven pin 31 (see FIGS. 9 and 10), and the choke valve 25 is automatically brought into the fully opened state by the biasing force of the choke spring 30, whereby the concentration of the fuel-air mixture produced in the carburetor 23 assumes a usual value.

In this manner, the locked state of the choke-operating lever 32 is released automatically by utilizing the turning movement of the brake shoe 16 to the brake-releasing position B. Therefore, the special returning operation of the choke-operating lever 32 is not required and thus, it is possible to alleviate the burden on the operator, and also to prevent the malfunction of the engine 4 and the degradation of the fuel consumption due to the operator forgetting to open the choke valve 25.

The viscosity resistance of the damper oil 42 in the oil damper 38 has a characteristic that it is larger at a lower temperature of the oil and smaller at a higher temperature of the oil. Therefore, when the environmental temperature of the engine 4 is lower, the damping force generated by the damper 38 is increased. Hence, the time required for moving from the full closing to the full opening of the choke valve 25 can be controlled automatically, so that the time is longer when the environmental temperature of the engine 4 is lower, and the time is shorter when the environmental temperature is higher. Thus, it is possible to satisfy the easy/ready startability of the engine, the stability of the warming operation of the engine and a low fuel consumption.

The damper 38 comprising the damper housing 40, the rotor 41 and the damper oil 42 is constituted by a reduced number of parts to be compact. This can contribute to a reduction in cost of and the compactness of the choke valve control system.

The rotor 41 of the damper 38 is rotatable in a normal direction and in a reverse direction and hence, even if the choke-operating lever 32 is operated to the closing position by mistake in a warm season, the choke-operating lever 32 can be returned immediately to the opening position O by applying an operating force in a reverse direction to the choke-operating lever 32.

If the engine is started, the crankshaft 5 rotates the mowing blade 7 and hence, the operator can push the lawn mower 1 while grasping the steering handlebar 6 along with the brake-releasing lever 20 to carry out the lawn mowing work. During the lawn mowing work, cooling air is drawn into the engine cover 10 through the cooling-air intake ports 13 by the rotation of the flywheel 9 also serving as the cooling fan and then fed to various portions of the engine 4. In this process, the cooling air is passed through the choke valve control system 27, and at the same time the cooling air blows away a dust deposited on the choke valve control system 27 to clean the choke valve control system 27. The choke valve control system 27 including the choke-operating lever 32, the cam 37, the damper 38 and the like is mounted to the lower surface of the bracket 14, so that it is difficult for dust to be deposited thereto. This also enhances the effect of cleaning the choke valve control system 27. Therefore, it is possible to prevent dust blown up during mowing of a lawn by the mowing blade from being accumulated on the choke valve control system 27, thereby preventing in advance any associated malfunction of the choke valve control system 27, and also cooling the choke valve control system 27 to enhance the durability thereof.

Moreover, the choke-operating lever 32 can be opened and closed easily without being obstructed by the engine cover 10, because its tip end protrudes to the outside of the engine cover 10. Further, the choke-operating lever 32 can be visually seen and hence, the position of the choke-operating lever 32 can be confirmed easily, and the choke valve 25 can be controlled easily and appropriately.

The cooling air which has cooled the various portions of the engine 4 is discharged from the periphery of the engine 4 to the outside.

If the operating force is then released from the brake-releasing lever 20 to stop the operation of the engine 4, the brake shoe 16 is swung to the braking position A by the biasing force of the brake spring 19 and in response to this, the engine-killing switch 22 is operated to bring the ignition circuit into the inoperative state. Therefore, the inertial rotation of the crankshaft 5 and the mowing blade 7 can be stopped immediately by a frictional braking force applied to the outer peripheral surface of the flywheel 9 by the brake shoe 16.

On the other hand, the locking lever 50 is released, via operation of link 53, when the brake shoe 16 is swung to the braking position A, and is turned downwards by the biasing force of the locking spring 55, whereby the locking claw 50a is urged against the upper surface of the cam 37 to prepare for the next locking of the choke-operating lever 32 at the closing position C.

Figure 13:
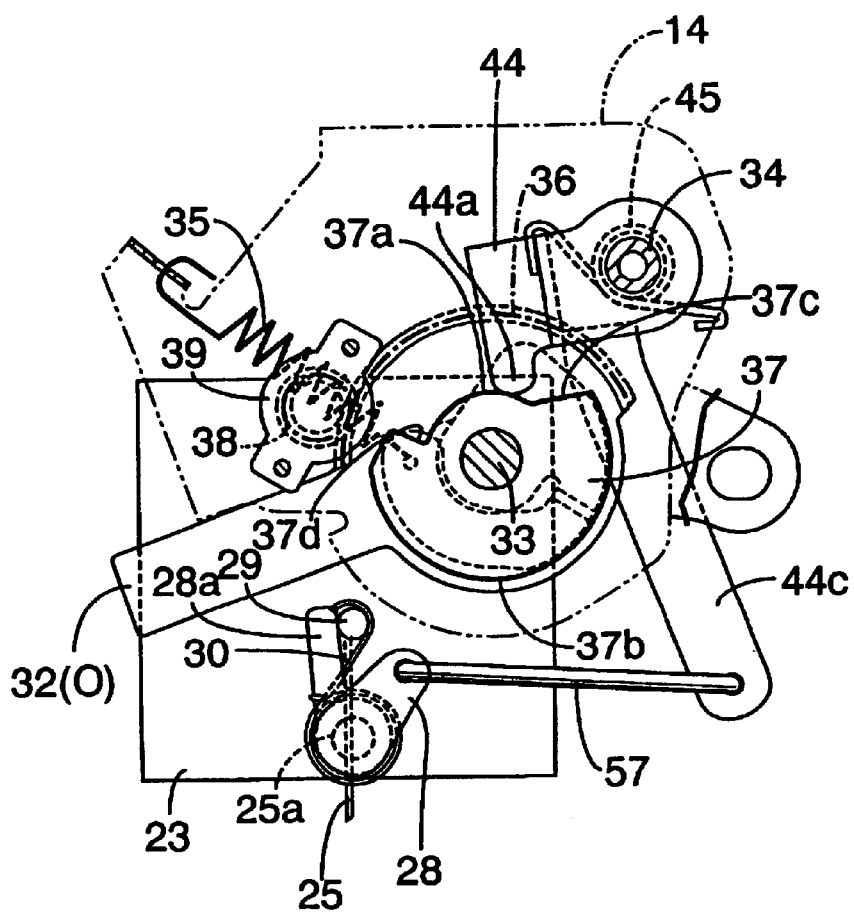
FIG. 13 is a view similar to FIG. 6, but showing a second embodiment of the present invention.

A second embodiment of the present invention shown in FIG. 13 will be described below.

In the second embodiment, an extension arm 44c is formed integral with a cam follower 44 and is connected via a link 57 to a choke lever 28, instead of using the resilient driving plate 47 and the driven pin 31 in the first embodiment. The arrangement of the other components is the same as those in the first embodiment, and hence portions or components corresponding to those in the first embodiment are designated by the same reference numerals and symbols, and the description of them is omitted.

A third embodiment of the present invention shown in FIGS. 14 to 16 will be described below.

A choke-operating lever 32 is mounted through a damper 38. The damper 38 is basically similar to the damper 38 in the first embodiment and is an oil type comprising a damper housing 40 secured to the bracket 14 by a machine screw 46, a rotor 41 rotatably housed in the damper housing 40, and a damper oil 42 accommodated in a sealed manner to apply a damping force attributable to a viscosity resistance to the rotor 41. The damper oil 42 has a viscosity characteristic so that the viscosity is increased in accordance with a temperature drop. The rotor 41 includes a rotor shaft 41a which is rotatably supported on a bearing portion 40a of the damper housing 40 with a seal member 56 interposed therebetween.

The main feature of the third embodiment lies in that the choke-operating lever 32 is integrally connected to an outer end of the rotor shaft 41a. Therefore, the choke-operating lever 32 is capable of being turned along with the rotor 41 between an opening position O and a closing position C, and a return spring 35 for biasing the choke-operating lever 32 toward the opening position O is mounted between the operating lever 32 and the bracket 14.

A cam 37 formed on the choke-operating lever 32 has, on its outer periphery, a cam surface comprising a minor arc-shaped valley 37a having a relatively small radius about the rotor shaft 41a, a major arc-shaped crest 37b having a relatively large radius about the rotor shaft 41a, a slant 37c which connects one end of the valley 37a and one end of the crest 37b to each other, and a precipice face 37d connecting the other ends of the valley 37a and the crest 37b to each other. A cam follower 44 is mounted to the bracket 14 for rotation by a second pivot 34, and operably connects the cam 37 and the choke lever 28 to each other. The cam follower 44 has a projection 44a adapted to slidably abut against the cam surface of the cam 37. An urging spring 45 is connected to the projection 44a to bring the projection 44a into abutment against the cam surface of the cam 37. When the choke-operating lever 32 is in the opening position O, the projection 44a is in abutment against the valley 37a of the cam 37, and when the choke-operating lever 32 is turned through a predetermined angle from the opening position O toward the closing position C, the position of abutment of the projection 44a is shifted via the slant 37c to the crest 37b.

A resilient driving plate 47 comprising a leaf spring for driving a driven pin 31 of the choke lever 28 is connected to a mounting piece 44b at a tip end of the cam follower 44 by a machine screw 48.

The damper 38 is capable of controlling the turning speed of the choke-operating lever 32 to a lower speed, and the cam 37 is capable of transmitting the closing motion for the choke valve 25 of the choke-operating lever 32 to the choke valve 25 through the cam follower 44 in a retarded manner.

Figure 14:
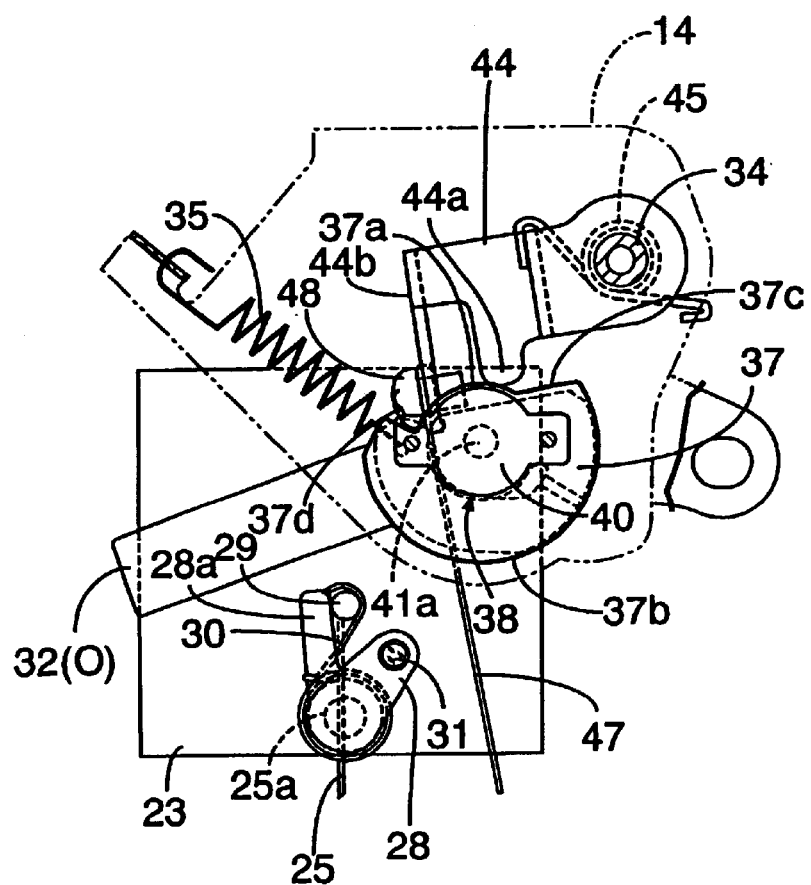
FIG. 14 is a view similar to FIG. 10, but showing a third embodiment of the present invention.
Figure 15:
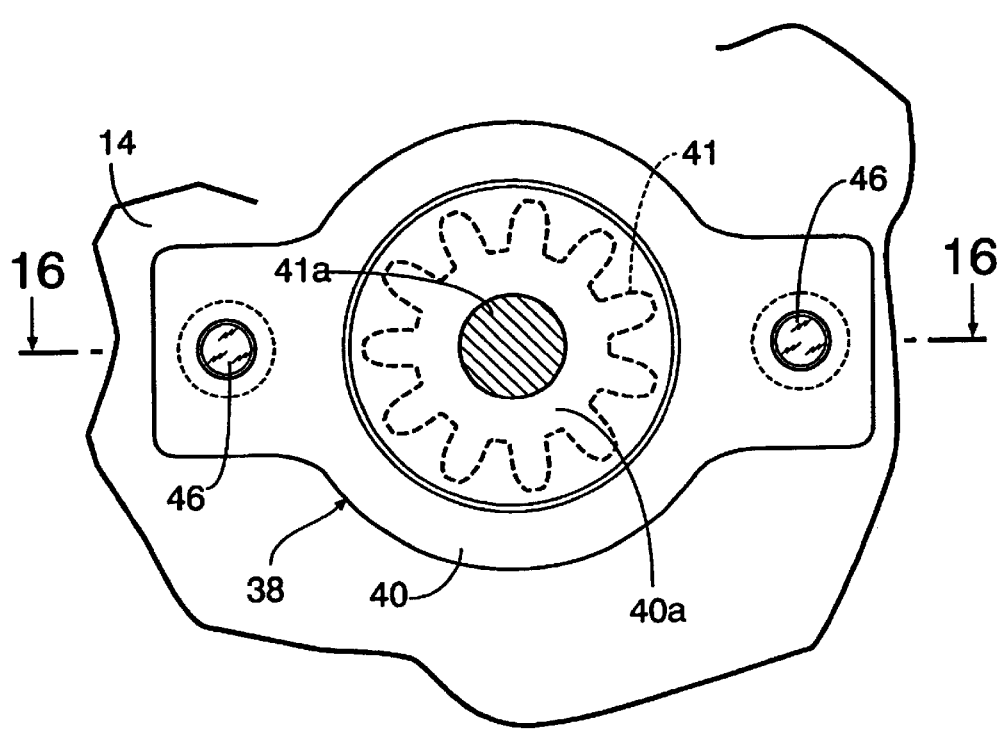
FIG. 15 is an enlarged plan view of a damper section in FIG. 14 (a sectional view taken along a line 15—15 in FIG. 16)
Figure 16:
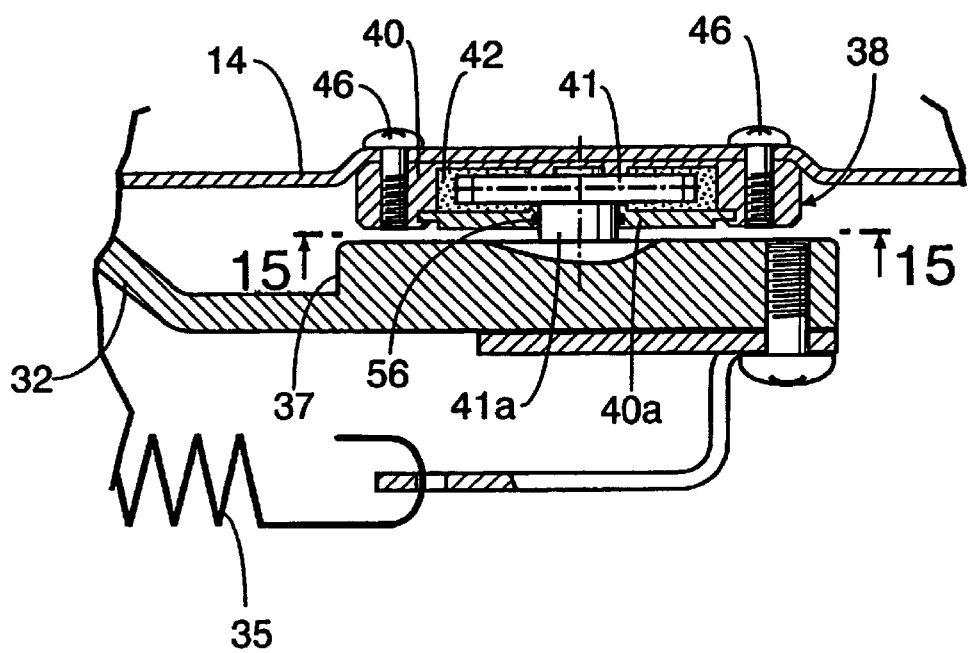
FIG. 16 is a sectional view taken along a line 16—16 in FIG. 15.

The arrangement of the other components is the same as those in the first embodiment, and hence portions or components corresponding to those in the first embodiment are designated by the same reference numerals and symbols in FIGS. 14 to 16, and the description of them is omitted.

With the third embodiment, the integral connection of the rotor 41 of the damper 38 and the choke-operating lever 32 to each other leads to a reduction in number of parts of the choke valve control system to simplify the structure, and provides the compactness and a reduction in cost of the choke valve control system.

Figure 17:
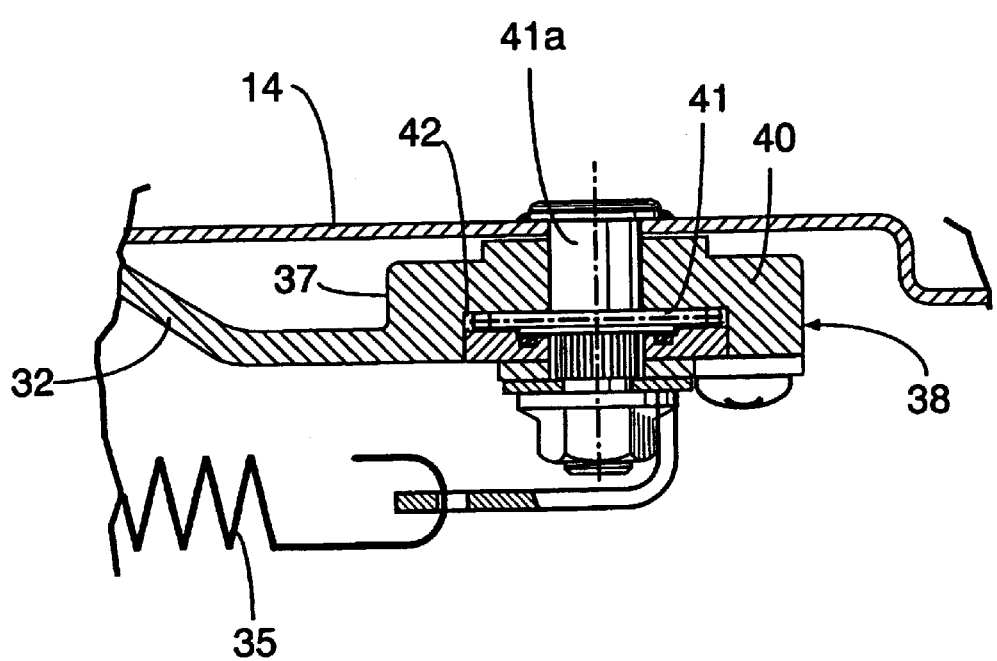
FIG. 17 is a view similar to FIG. 16, but showing a fourth embodiment of the present invention.

A fourth embodiment of the present invention shown in FIG. 17 will be described below.

In the fourth embodiment, in an oil-type damper 38, a rotor shaft 41a is fixed to the bracket 14, and a choke-operating lever 32 is integrally connected to a damper housing 40. The arrangement of the other components is the same as those in the third embodiment, and hence portions or components corresponding to those in the third embodiment are designated by the same reference numerals and symbols in FIG. 17, and the description of them is omitted.

Also with the fourth embodiment, the integral connection of the damper housing 40 and the choke-operating lever 32 to each other leads to a reduction in the number of parts of the choke valve control system to simplify the structure.

Figure 18:
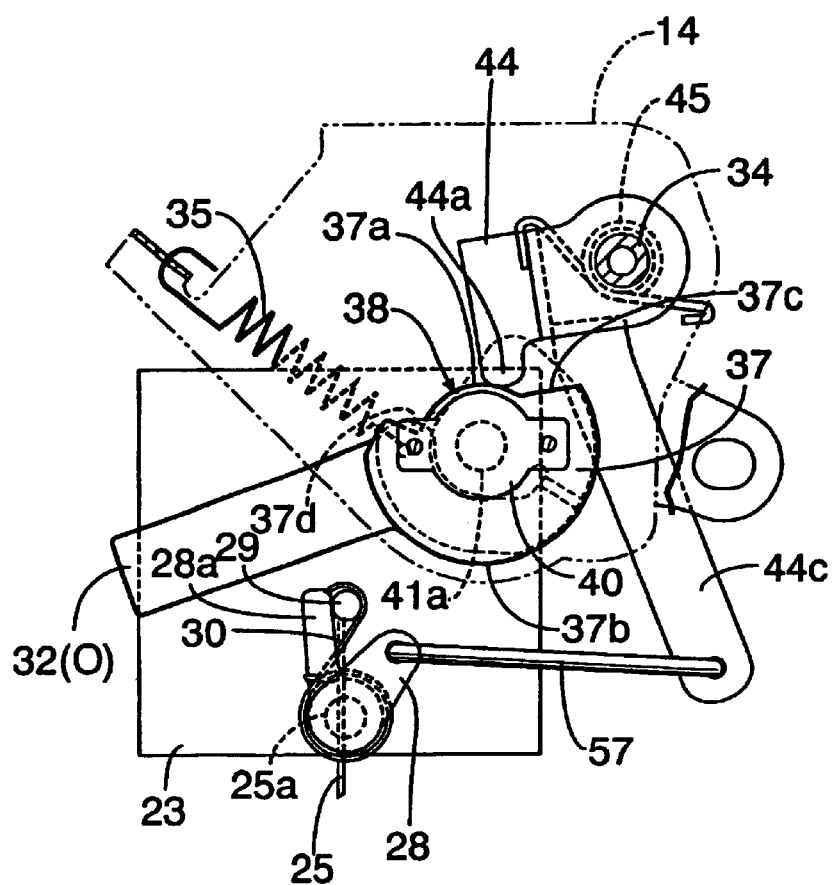
FIG. 18 is a view similar to FIG. 13, but showing a fifth embodiment of the present invention.

Finally, a fifth embodiment of the present invention shown in FIG. 18 will be described below.

The fifth embodiment corresponds to the second embodiment, except that a damper 38 is disposed so that a choke-operating lever 32 is integrally connected to an outer end of a rotor shaft 41a of the damper 38. The arrangement of the other components is the same as those in the second embodiment, and hence portions or components corresponding to those in the second embodiment are designated by the same reference numerals and symbols, and the description of them is omitted.

The present invention is not limited to the above-described embodiments, and various modifications in design may be made without departing from the spirit and scope of the invention defined in the claims. For example, the shape of the cam surface of the cam 37 may be selected as desired, depending on the opening characteristic required for the choke valve 25.

What is claimed is:

1. A control system for a choke valve of a carburetor, including a choke-operating lever for opening and closing the choke valve of the carburetor, a choke spring for biasing said valve in an opening direction, and a damper for controlling opening motion to a lower speed, when said choke valve is opened from a fully closed position by a biasing force of said choke spring, said choke-operating lever, said choke spring and the damper being connected to said choke valve of said carburetor,
   wherein said damper is an oil type using a damper oil whose viscosity is increased in accordance with temperature decrease.

2. A control system for a choke valve of a carburetor according to claim 1, wherein said damper includes a damper housing, a rotor rotatably housed in said damper housing, and said damper oil accommodated in a sealed manner in said damper housing and applying a viscosity resistance to the rotation of said rotor, said damper housing being supported on a stationary structure, and said rotor being connected to said choke valve so that said rotor is rotated in operable association with the opening and closing of said choke valve.

3. A control system for a choke valve of a carburetor according to claim 2, further including a driven member connected to a valve stem of the choke valve, and a resilient driving member connected to said choke-operating lever and adapted to be flexed to urge one side of said driven member in operable association with the operation of said choke-operating lever in a direction of closing the choke valve, thereby closing the choke valve.

4. A control system for a choke valve of a carburetor according to claim 2, further including a cam adapted to be rotated in operable association with the opening and closing operation of said choke-operating lever, and a cam follower adapted to be moved following a cam surface of said cam to open and close the choke valve, said cam and said cam follower being interposed between said choke-operating lever and the choke valve.

5. A control system for a choke valve of a carburetor according to claim 1, further including a driven member connected to a valve stem of the choke valve, and a resilient driving member connected to said choke-operating lever and adapted to be flexed to urge one side of said driven member in operable association with the operation of said choke-operating lever in a direction of closing the choke valve, thereby closing the choke valve.

6. A control system for a choke valve of a carburetor according to claim 1, further including a cam adapted to be rotated in operable association with the opening and closing operation of said choke-operating lever, and a cam follower adapted to be moved following a cam surface of said cam to open and close the choke valve, said cam and said cam follower being interposed between said choke-operating lever and the choke valve.

7. A control system for a choke valve of a carburetor according to claim 1, wherein said damper includes a damper housing and said damper oil accommodated in a sealed manner in said damper housing and applying a viscosity resistance to the rotation of a rotor, said damper housing being supported on a stationary structure, and wherein said rotor and said cam are connected to each other through an accelerating mechanism for accelerating the rotation of said cam to transmit it to said rotor.

8. A control system for a choke valve of a carburetor according to claim 1, wherein said damper includes a damper housing, a rotor rotatably housed in said damper housing, and said damper oil which is accommodated in a sealed manner in said damper housing and whose viscosity is increased in accordance with a temperature decrease to apply a viscosity resistance to the relative rotation of said rotor and said damper housing, one of said damper housing and said rotor being secured to a stationary structure, said choke-operating lever being integrally connected to the other of said damper housing and said rotor, and wherein a return spring for biasing said choke-operating lever in a direction to open the choke valve is connected to said choke-operating lever.

9. A control system for a choke valve of a carburetor according to claim 8, wherein said choke-operating lever is provided with a cam which is engaged with a cam follower supported on the stationary structure and operably connected to the choke valve, said cam being formed so that the motion of said choke-operating lever for opening the choke valve is transmitted through said cam follower to the choke valve in a retarded manner.

10. A control system for a choke valve of a carburetor according to claim 1, further including a cam adapted to be rotated in operable association with the opening and closing operation of said choke-operating lever, and a cam follower adapted to be moved following a cam surface of said cam to open and close the choke valve, said cam and said cam follower being interposed between said choke-operating lever and the choke valve.

11. A control system for a choke valve of a carburetor according to claim 10, wherein said damper includes a damper housing, and said damper oil which is accommodated in a sealed manner in said damper housing and applies a viscosity resistance to the rotation of a rotor, said damper housing being supported on a stationary structure, and wherein said rotor and said cam are connected to each other through an accelerating mechanism for accelerating the rotation of said cam to transmit it to said rotor.

12. A control system for a choke valve of a carburetor in a power working machine including an engine which has a cooling fan mounted at an upper end of a crankshaft disposed vertically, a working device connected to a lower end of said crankshaft, and an engine cover which has a cooling-air intake port opposed to the cooling fan and covers an upper surface of the engine so that cooling air drawn through the cooling-air intake port by the cooling fan is guided to the engine,
   said control system comprising: a choke-operating lever for opening and closing a choke valve of a carburetor mounted on one side of the engine; a choke spring for biasing said choke valve in an opening direction; and a damper for controlling the motion of opening of the choke valve to a lower speed, when said choke valve is opened from its fully closed position by a biasing force of the choke spring, wherein said damper is an oil type using a damper oil whose viscosity is increased in accordance with a temperature decrease.

13. A control system for a choke valve of a carburetor in a power working machine according to claim 12, wherein said damper is disposed in a path for said cooling air extending from said cooling-air intake port to the engine.

14. A control system for a choke valve in a power working machine according to claim 12, wherein a tip end of said choke-operating lever is disposed to protrude outside of said engine cover.

15. A control system for a choke valve in a power working machine according to claim 12, wherein the power working machine further includes a braking mechanism capable of braking the rotation of an output shaft of the engine, and a brake release mounted on a steering handlebar for releasing the operational state of said braking mechanism; said choke-operating lever, said choke spring and said damper are connected to the choke valve; said choke-operating lever is adapted to be turned between an opening position and a closing position to open and close the choke valve; and a locking mechanism is interposed between said choke-operating lever and said braking mechanism and adapted to lock said choke-operating lever at the closing position when said braking mechanism is in operation, and to release the locked state of said choke-operating lever when the operation of said braking mechanism is released.

16. A control system for a choke valve of a carburetor in a working machine according to claim 15, wherein said damper includes a damper housing, a rotor rotatably housed in said damper housing, and said damper oil accommodated in a sealed manner in said damper housing and applying a viscosity resistance to the rotation of a rotor, said damper housing being supported on a stationary structure, said control system further comprising a cam adapted to be rotated in operable association with the opening and closing operation of said choke-operating lever and a cam follower adapted to be moved following a cam surface of said cam to open and close the choke valve, said cam and cam follower being interposed between said choke-operating lever and the choke valve; and wherein said rotor and said cam are connected to each other through an accelerating mechanism for accelerating the rotation of said cam to transmit it to said rotor.

* * * * *

UNITED STATES PATENT AND TRADEMARK OFFICE
CERTIFICATE OF CORRECTION

PATENT NO. : 6,722,638 B2
DATED : April 20, 2004
INVENTOR(S) : Hiroaki Kojima, Hiroshi Moriyama and Ryuhei Tamamoto It is certified that error appears in the above-identified patent and that said Letters Patent is hereby corrected as shown below:

Column 1,
Line 24, change "the damper an air type" to -- the damper is an air type --.

Column 2,
Line 52, change "by the damper, E and" to -- by the damper, and --.

Column 4,
Line 31, change "the damper an oil type using an" to -- the damper is an oil type using --.

Column 6,
Line 11, change "taken a long a line" to -- taken along a line --.

Column 8,
Line 16, change "relatively small radium" to -- relatively small radius --.

Column 11,
Line 50, change "as those in the first" to -- as that in the first --.

Column 12,
Line 56, change "same as those in the" to -- same as that in the --.

Column 13,
Line 3, change "is the same as those" to -- is the same as that --.

Signed and Sealed this

Fourth Day of January, 2005

JON W. DUDAS
*Director of the United States Patent and Trademark Office*